(12) United States Patent
Izraeli et al.

(10) Patent No.: US 10,434,981 B2
(45) Date of Patent: Oct. 8, 2019

(54) METHOD AND SYSTEM FOR VEHICLE PROTECTION

(71) Applicant: Traffilog LTD., Rosh-Haayin (IL)

(72) Inventors: Robert Izraeli, Holon (IL); Assi Bitton, Herzelia (IL); Arik Greenberger, Binyamina (IL)

(73) Assignee: Traffilog, Rosh Ha'ayin (IL)

( * ) Notice: Subject to any disclaimer, the term of this patent is extended or adjusted under 35 U.S.C. 154(b) by 0 days.

(21) Appl. No.: 15/186,675

(22) Filed: Jun. 20, 2016

(65) Prior Publication Data

US 2017/0361805 A1     Dec. 21, 2017

(51) Int. Cl.
   *B60R 25/00*     (2013.01)
(52) U.S. Cl.
   CPC .................................. *B60R 25/00* (2013.01)
(58) Field of Classification Search
   CPC ...................................................... B60R 25/04
   USPC .......................................................... 701/45
   See application file for complete search history.

(56) References Cited

U.S. PATENT DOCUMENTS

| | | | | |
|---|---|---|---|---|
| 4,965,827 A | * | 10/1990 | McDonald | G06Q 20/341 380/29 |
| 5,541,583 A | * | 7/1996 | Mandelbaum | G06K 7/0008 235/382 |
| 5,684,454 A | * | 11/1997 | Nishioka | B60R 25/04 123/179.2 |
| 5,719,550 A | * | 2/1998 | Bloch | B60R 25/102 180/287 |
| 5,734,721 A | * | 3/1998 | Clark | H04L 9/0662 380/46 |
| 5,757,085 A | * | 5/1998 | Fischer | B60R 25/04 180/287 |
| 5,821,631 A | * | 10/1998 | Loraas | B60R 25/04 340/5.3 |
| 7,091,824 B2 | * | 8/2006 | Matsubara | B60R 25/04 180/287 |
| 2002/0084887 A1 | * | 7/2002 | Arshad | B60R 25/04 340/5.61 |
| 2003/0141960 A1 | * | 7/2003 | Papp | B60R 25/24 340/5.61 |
| 2006/0175900 A1 | * | 8/2006 | Ono | B60R 25/045 307/10.1 |
| 2008/0129473 A1 | * | 6/2008 | Tsuruta | B60R 25/04 340/426.13 |
| 2012/0078473 A1 | * | 3/2012 | Ridder | A61B 5/0071 701/45 |

(Continued)

FOREIGN PATENT DOCUMENTS

| | | | |
|---|---|---|---|
| JP | 2001270424 A | * | 10/2001 |
| JP | 2002322972 A | * | 11/2002 |

(Continued)

*Primary Examiner* — Tuan C To

(74) *Attorney, Agent, or Firm* — Reches Patents

(57) ABSTRACT

A method for protecting a vehicle, the method may include providing, by an immobilizer, false error information that is associated with a false error; wherein the false error information, once received or processed by an electronic control unit (ECU) of the vehicle, contributes to an immobilizing the vehicle during a vehicle start process; and sending the false error information to the ECU, during a vehicle shut down process that preceded the vehicle start process.

38 Claims, 4 Drawing Sheets

(56) References Cited

U.S. PATENT DOCUMENTS

2014/0189462 A1* 7/2014 Rohleder ............ G06F 11/1048
714/758
2014/0358359 A1* 12/2014 Yagi .................... F02N 11/0814
701/31.4
2017/0096958 A1* 4/2017 Jiang ...................... F01N 11/00

FOREIGN PATENT DOCUMENTS

| JP | 2004068823 A | * | 3/2004 |
| JP | 4306920 B2 | * | 8/2009 |

* cited by examiner

METHOD AND SYSTEM FOR VEHICLE PROTECTION

BACKGROUND

A modern vehicle usually includes an immobilizer that prevents the ignition of the engine of the vehicle. The immobilizer usually controls the electrical signal that is sent to the starter.

Immobilizers may be bypassed thereby allowing the engine to be ignited and the vehicle to be stolen. The bypassing of the immobilizer may involve removing the immobilizer or otherwise preventing the immobilizer from disabling the starter.

There is a growing need to secure the vehicle even when the immobilizer is bypassed.

SUMMARY

According to an embodiment of the invention various methods may be provided and are described in the specification.

According to various embodiments of the invention there may be provided a non-transitory computer readable medium that may store instructions for performing any of the methods described in the specification and any steps thereof, including any combinations of same.

According to an embodiment of the invention there may be provided a method for protecting a vehicle, the method may include providing, by an immobilizer, false error information that is associated with a false error; wherein the false error information, once received or processed by an electronic control unit (ECU) of the vehicle, contributes to an immobilizing the vehicle during a vehicle start process; and sending the false error information to the ECU, during a vehicle shut down process that preceded the vehicle start process.

The method may include sending to the ECU, during the vehicle start process, revoking information for revoking the false error information; wherein the revoking information is provided by the immobilizer.

The false error information may be false error data.

The false error information may include a false error command.

The method may include generating the false error data at a format that equals a format of error data generated by an ECU to indicate an occurrence of an actual error.

The method may include generating the false error data; wherein the generating of the false error data may include introducing a difference between a format of the false error data and a format of error data generated by an ECU to indicate an occurrence of an actual error.

The difference may be detectable to a vehicle diagnostic system.

The method may include generating information about false error messages and/or false error commands provided by the immobilizer.

The method may include feeding a vehicle diagnostic system with the information about false error messages and/or false error commands provided by the immobilizer.

The method may include distributing the false error information.

According to an embodiment of the invention there may be provided a non-transitory computer readable medium that may store instructions that once executed by an immobilizer, cause the immobilizer to execute the steps of: providing false error information that is associated with a false error; wherein the false error information, once received or processed by an electronic control unit (ECU) of the vehicle, contributes to an immobilizing the vehicle during a vehicle start process; and sending the false error information to the ECU, during a vehicle shut down process that preceded the vehicle start process.

The non-transitory computer readable medium may store instructions for sending to the ECU, during the vehicle start process, revoking information for revoking the false error information; wherein the revoking information is provided by the immobilizer.

The false error information may be false error data.

The false error information may include a false error command.

The non-transitory computer readable medium may store instructions for generating the false error data at a format that equals a format of error data generated by an ECU to indicate an occurrence of an actual error.

The non-transitory computer readable medium may store instructions for generating the false error data; wherein the generating of the false error data may include introducing a difference between a format of the false error data and a format of error data generated by an ECU to indicate an occurrence of an actual error.

The difference may be detectable to a vehicle diagnostic system.

The non-transitory computer readable medium may store instructions for generating information about false error messages and/or false error commands provided by the immobilizer.

The non-transitory computer readable medium may store instructions for feeding a vehicle diagnostic system with the information about false error messages and/or false error commands provided by the immobilizer.

The non-transitory computer readable medium may store instructions for distributing the false error information.

According to an embodiment of the invention there may be provided an immobilizer that comprises a communication module and a processor; wherein the processor is configured to provide false error information that is associated with a false error; wherein the false error information, once received or processed by an electronic control unit (ECU) of the vehicle, contributes to an immobilizing the vehicle during a vehicle start process; and wherein the communication module is configured to send the false error information to the ECU, during a vehicle shut down process that preceded the vehicle start process.

The method may include sending to the ECU, during the vehicle start process, revoking information for revoking the false error information; wherein the revoking information is provided by the immobilizer.

The false error information may be false error data.

The false error information may include a false error command.

The immobilizer may be configured to generate the false error data at a format that equals a format of error data generated by an ECU to indicate an occurrence of an actual error.

The immobilizer may be configured to generate the false error data; wherein the generating of the false error data may include introducing a difference between a format of the false error data and a format of error data generated by an ECU to indicate an occurrence of an actual error.

The difference may be detectable to a vehicle diagnostic system.

The immobilizer may be configured to generate information about false error messages and/or false error commands provided by the immobilizer.

The immobilizer may be configured to feed a vehicle diagnostic system with the information about false error messages and/or false error commands provided by the immobilizer.

The immobilizer may be configured to distribute the false error information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
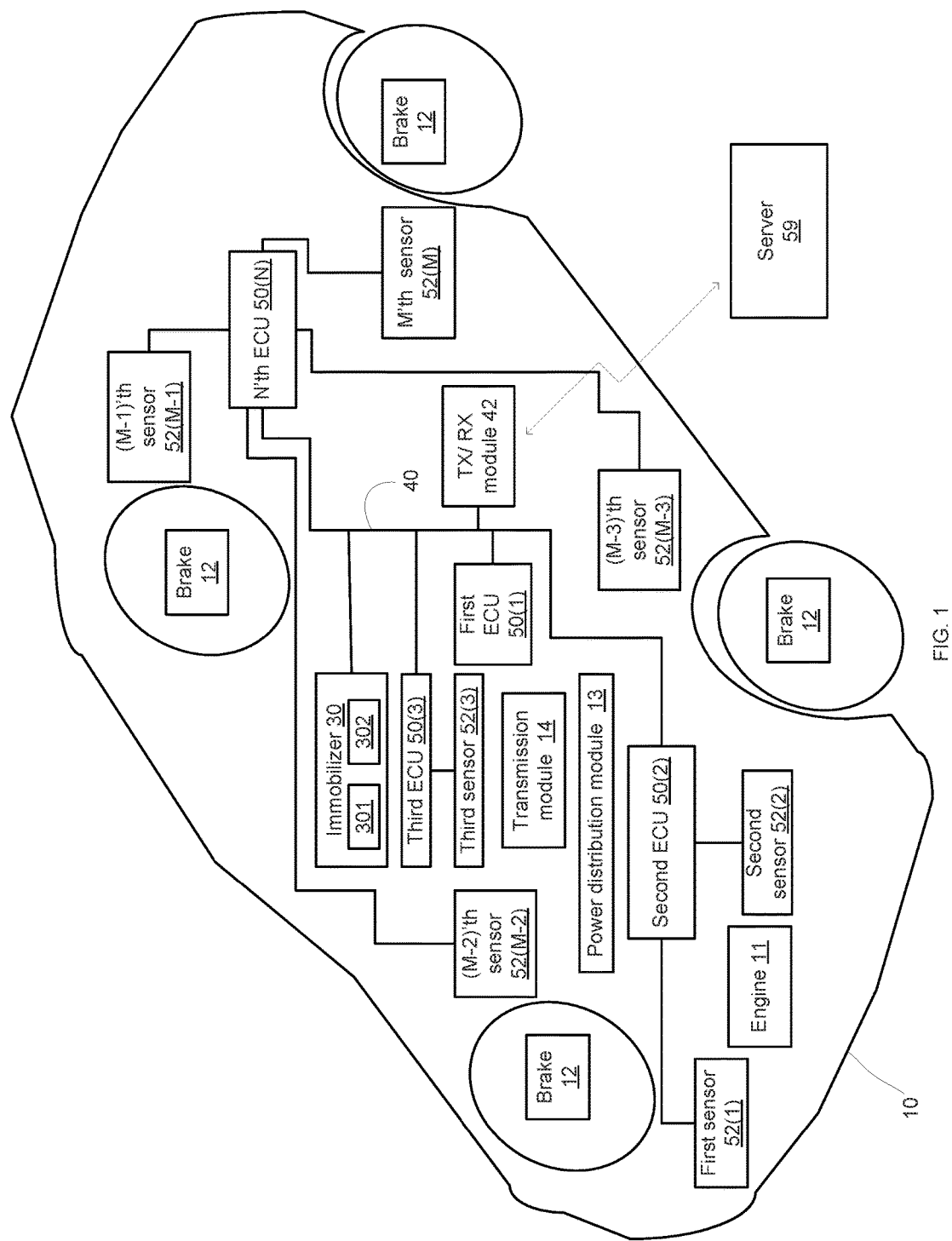
FIG. 1 illustrates a vehicle and a server according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

According to an embodiment of the invention there is provided a method, non-transitory computer readable medium and car monitor for protecting a vehicle by generating, by an immobilizer, false error information during a vehicle shut down process. The shutdown process may be initiated by the driver—when the driver shuts down the vehicle. The false error information command will immobilize the vehicle unless the false error information is revoked by the immobilizer during a vehicle start process. Accordingly—even if the immobilizer is bypassed by a hacker or a thief—the false error information will still cause the engine control module to immobilize the vehicle. When there are many engine control modules the immobilizer may send the false error information to one or more engine control modules at a time.

The false error information may include false error data and/or false error command.

The false error data may have a form of an error message that is generated by any one of the electronic control units of the vehicle. The error indicated by the false error data may be an error that prevents the vehicle from being ignited or otherwise moved. The error indicated by the false error data may be a critical error such as an engine failure, a breaks failure, and the like.

The false error command may instructor request one or more electronic control units and/or one or more sensors coupled to the one or more electronic control units to generate error data. The one or more electronic control units and/or one or more sensors may or may not be aware that the error data generated in response to the false error command is a false error.

The false error data may differ from real error data by a certain difference that may be detected by a vehicle diagnostic system such as a vehicle diagnostic system that is located at a garage or any auto-repair business.

Additionally or alternatively, the immobilizer (or another component of the vehicle) may generate information about false error messages and/or false error commands sent by the immobilizer and this information may be fed to a vehicle diagnostic system—so that the vehicle diagnostic system may, when evaluating the vehicle, be aware that errors related to these false error data and/or commands are false errors.

According to an embodiment of the invention the immobilizer or another computerized element of the vehicle may receive error information from electronic control units of the vehicle and modify the error information based on the false error data and/or commands generated by the immobilizer. The modifying may include deleting information about false errors generated by or triggered by the immobilizer. The modifying may include and/or marking error information as false errors generated by or triggered by the immobilizer.

It should be noted that there are multiple (and usually many) electronic control units of the vehicle and that the immobilizer may distribute the false error messages and/or false error commands between the different electronic control units in a random manner, in a pseudo random manner and/or according to a predefined scheme, and/or in response to the history of the vehicle (the history may include previous theft attempts, previous real failure, and the like) and/or expected failures of the vehicle. For example if a certain vehicle model or vehicles of a certain car manufacturer have one or more typical errors the immobilizer may generate false error data and/or instructions that differ from these one or more typical errors (making the detection of the false errors more difficult) and/or select one of these one or more typical error (making the errors to be less suspicious).

The false error data and/or command may be sent to any one of the electronic control units of the vehicle. An electronic control unit ECU (see www.wikipedia.org) is a generic term for any embedded system that controls one or more of the electrical system or subsystems in a motor vehicle.

Types of ECU include electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), and the like. Taken together, these systems are sometimes referred to as the car's computer. (Technically there is no single computer but multiple ones.) Sometimes one assembly incorporates several of the individual control modules (PCM is often both engine and transmission).

The electronic/engine control module (also referred to as EMS—engine management system) controls various engine functions like fuel injection, ignition timing and idle speed control system. All these control are done based on data (like engine coolant temperature, air flow, crank position etc) received from various sensors.

The powertrain control module monitors and controls speed control, charging and automatic transmission and air conditioning.

The suspension control module controls the suspension system—especially controls components such as shock absorbers or strut cartridges.

The brake control module controls the breaks of the vehicle.

The body control module may be responsible for monitoring and controlling various electronic accessories in a vehicle's body. Typically in a car the BCM controls the power windows, power mirrors, air conditioning, immobilizer system, central locking, etc.

The different ECUs may be fed by various sensors such as but not limited to speed sensors, accelerometers, engine sensors, break sensors, and various other sensors.

A false error data and/or command may be sent to any one of the electronic/engine control module, powertrain control module, transmission control module, brake control module, central control module, central timing module, general electronic module, body control module, suspension control module.

FIG. 1 illustrates a vehicle 10 according to an embodiment of the invention.

Vehicle 10 includes multiple (N) EUCs such as first ECU 50(1), second ECU 50(2), and third ECU 50(3) till N'th ECU 50(N). N is a positive integer that may exceed two.

The N ECUs may include any known ECU—such as but not limited to electronic/engine control module (ECM), powertrain control module (PCM), transmission control module (TCM), brake control module (BCM or EBCM), central control module (CCM), central timing module (CTM), general electronic module (GEM), body control module (BCM), suspension control module (SCM), and the like.

The N ECUs may be coupled to multiple (M) sensors such as first sensor 52(1), second sensor 53(2), and third sensor 52(3) till M'th sensor 52(M). M is a positive integer that may exceed two. M may differ then N or may equal N. An MCU (of the N MCUs) may be coupled to one or more sensor or may not be coupled to any sensor.

FIG. 1 illustrates vehicle as including various components or units (only some of the components and units of the vehicle are shown—for simplicity of explanation) such as engine 11, brakes 12, power distribution module 13 for distributing electrical power, transmission module 14, immobilizer 30, network 40, and communication module (denoted TX/RX module) 42.

The immobilizer 30 may include hardware components such as but not limited a housing (for a non-limiting example—a tamper proof or otherwise rigid housing) that encloses a hardware processor (denoted 301) and communication module (denoted 302).

Some of the components and units are sensed by sensors 52(1)-52(M) and/or are controlled by ECUs 50(1)-50(N).

In FIG. 1 network 40 is coupled to all ECUs 50(1)-50(N), to immobilizer 30 and to the communication module 40. It should be noted that any system or method for exchanging data and/or commands between the ECUs and other units or components of the vehicle can be provided. For example in FIG. 2 the immobilizer 30 is coupled to the first ECU via link 41 and is not directly coupled to network 40. Yet for another example—in FIG. 3 the immobilizer 30 is included within the first ECU 50(1).

Network 40 may be any type of wired and/or wireless network. Network 40 may support any protocol—such as but not limited to the CANBUS protocol. The false error message may be CANBUS compliant, non-CANBUS compliant and the like.

According to an embodiment of the invention the immobilizer 30 is configured to send to one or more of ECUs 50(1)-50(N) and/or to one or more sensors 52(1)-52(M) a false error message during a vehicle shut down process. The immobilizer 30 may include processor 301 and communication module 302. The processor 301 may be a general purpose processor that hosts immobilizer software, may be a dedicated processor, a controller and the like).

Figure 2:
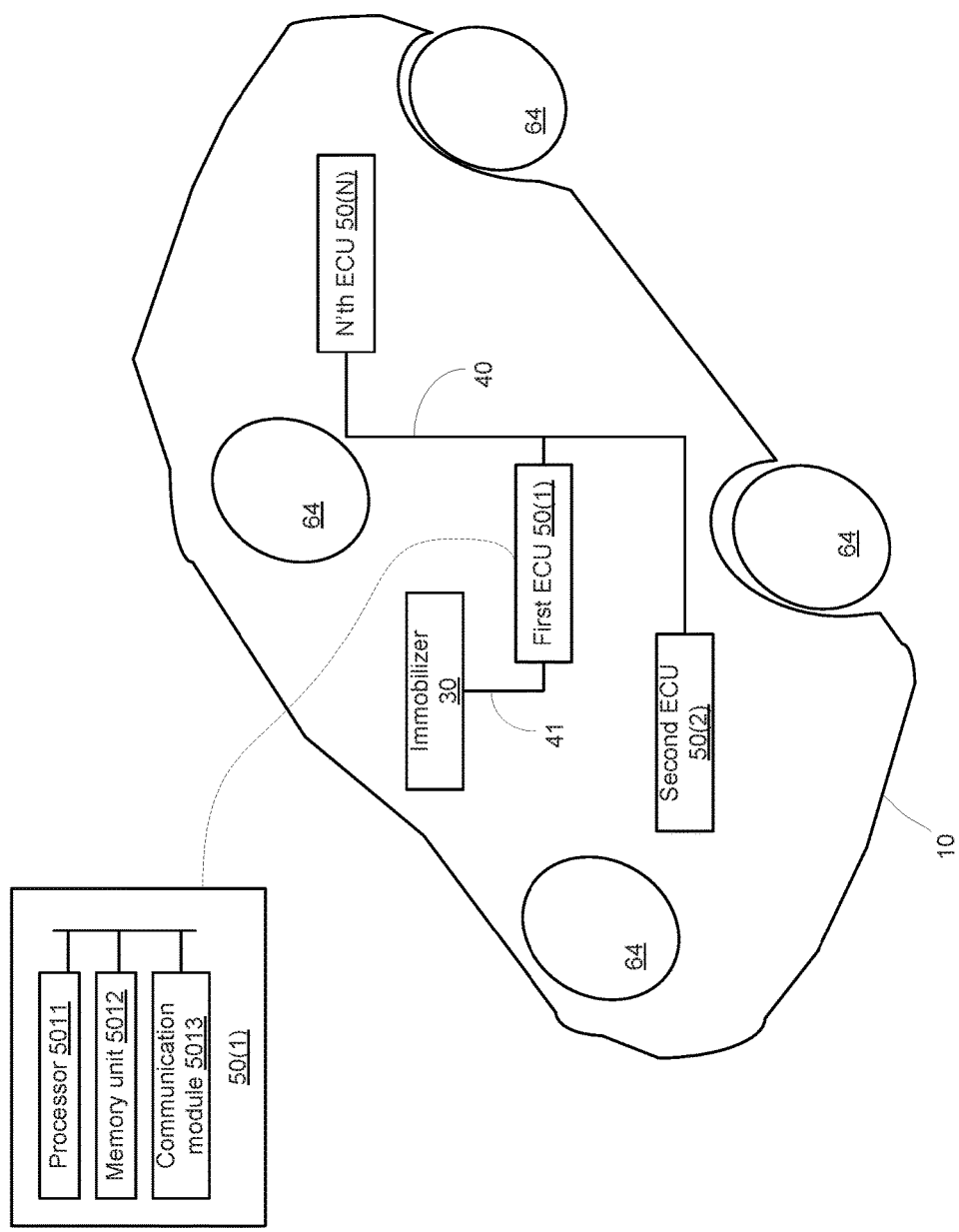
FIG. 2 illustrates a vehicle according to an embodiment of the invention.
Figure 3:
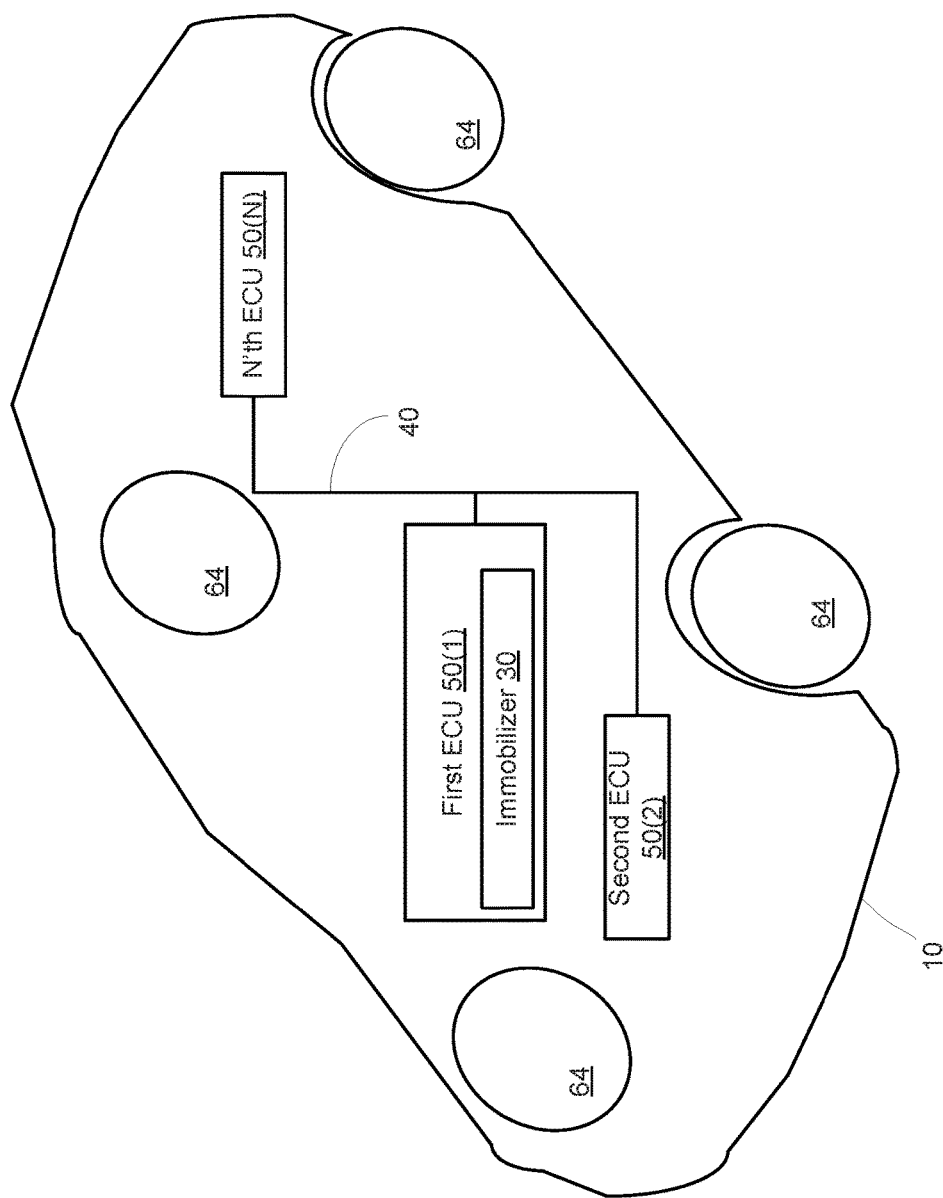
FIG. 3 illustrates a vehicle according to an embodiment of the invention.

Each ECU may include (as illustrated in FIG. 2) a processor 5011, memory unit 5012 and a communication module 5013. The communication module 5013 may communicate (for example—via network 40) with immobilizer 30, other ECUs and/or one or more sensors. The memory unit 5012 may store code, sensor readings, false error data and/or false error command.

The false error data and/or command may be received (during a certain vehicle shut down process) via communication module 5013 and be fed to the processor 5011 and/or the memory unit 5012.

The false error command may cause the ECU to generate ECU false error data that will represent a false error.

Unless revoked by the immobilizer during a vehicle start process—when the vehicle is started (following the certain shut down process) the ECU may output the false error data (or the ECU false error data)—and this may prevent the ECU itself or another ECU of the vehicle to immobilize the vehicle.

The false error data may be revoked by the immobilizer by sending revoking information. The revoking information may include revoking data and/or revoking command.

The revoking information may indicate that the false error does not exist anymore, may cause one or more ECU to ignore the false error information, delete the false error information, and the like.

According to an embodiment of the invention the first ECU 50(1) may be a central control module that communicates with other ECUs (such as second, third and N'th ECUs 50(2), 50(3) and 50(N)). The false error data and/or command may be sent by immobilizer to one of the other ECUs—and unless revoked by the immobilizer 30—during a vehicle start process one or the other ECUs may send the first ECU 50(1) error data that will cause the first ECU 50(1) to immobilize vehicle 10.

Figure 4:
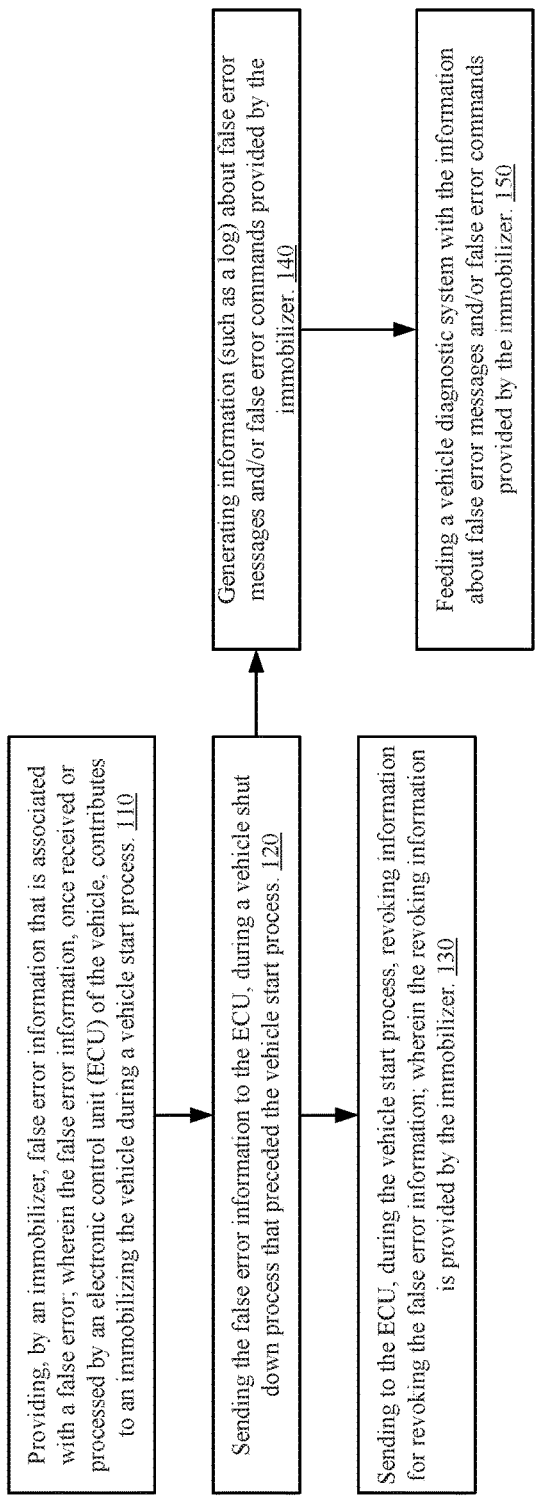
FIG. 4 illustrates a method according to an embodiment of the invention.

FIG. 4 illustrates method 100 according to an embodiment of the invention.

Method 100 may start by step 110 of providing, by an immobilizer, false error information that is associated with a false error; wherein the false error information, once received or processed by an electronic control unit (ECU) of the vehicle, contributes to an immobilizing the vehicle during a vehicle start process.

The immobilizer 30 may generate the false error information or may receive the false error information from another unit and output the false error unit. Step 110 of providing may include outputting the false error information and/or preparing the false error information to be sent (for example storing in an output buffer).

The false error information may be false error data and/or may include a false error command to be executed by the ECU.

The false error data may have a format that equals a format of error data generated by an ECU to indicate an occurrence of an actual error. A format may refer to the size of the message, to allocation of fields within the message, to the content of one or more fields in the message, and the like.

The false error data may differ (by a difference) from a format of error data generated by an ECU to indicate an occurrence of an actual error. This difference may be detected by a vehicle diagnostic system.

Step 110 may be followed by step 120 of sending the false error information to the ECU, during a vehicle shut down process that preceded the vehicle start process.

Step 120 may be followed (if the immobilizer was not remover or otherwise bypassed) by step 130 of sending to the ECU, during the vehicle start process, revoking information for revoking the false error information; wherein the revoking information is provided by the immobilizer.

Step 120 may also be followed by step 140 of generating information (such as a log) about false error messages and/or false error commands provided by the immobilizer.

Step 140 may be followed by step 150 of feeding a vehicle diagnostic system with the information about false error messages and/or false error commands provided by the immobilizer.

The vehicle diagnostic system may evaluate the state of the vehicle. It is beneficial to notify the vehicle diagnostic system which errors were false errors that are attributed to the false error information.

The invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system.

The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices. Alternatively, the computer system may be implemented by a FPGA.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for protecting a vehicle, the method comprising:
providing, by an immobilizer, false error information that is associated with a false error, wherein the false error information is false as it does not represent an occurrence of an actual error; wherein the false error information, once received or processed by an electronic control unit (ECU) of the vehicle, contributes to an immobilizing the vehicle during a vehicle start process; and
sending the false error information to the ECU, during a vehicle shut down process that preceded the vehicle start process.

2. The method according to claim 1, comprising sending to the ECU, during the vehicle start process, revoking information for revoking the false error information; wherein the revoking information is provided by the immobilizer.

3. The method according to claim 2, wherein the false error information is false error data.

4. The method according to claim 2, wherein the false error information comprises a false error command that instructs the ECU to generate false error data; and generating by the ECU the false error data.

5. The method according to claim 3, comprising generating the false error data at a format that equals a format of error data generated by an ECU to indicate an occurrence of an actual error.

6. The method according to claim 3, comprising generating the false error data; wherein the generating of the false error data comprises introducing a difference between a format of the false error data and a format of error data generated by an ECU to indicate an occurrence of an actual error.

7. The method according to claim 6, wherein the difference is detectable to a vehicle diagnostic system.

8. The method according to claim 2, comprising generating information about at least one out of false error messages and false error commands provided by the immobilizer.

9. The method according to claim 8, comprising feeding a vehicle diagnostic system with the information about the at least one out of the false error messages and the false error commands provided by the immobilizer.

10. The method according to claim 2 comprising distributing the false error information.

11. The method according to claim 1 comprising immobilizing the vehicle, during the vehicle start process and by the ECU, unless the immobilizer revokes the false error information.

12. The method according to claim 1 comprising sending false error data, by the ECU and to an other ECU, following a reception of the false error information by the ECU; and immobilizing the vehicle, during the vehicle start process and by the other ECU, unless the immobilizer revokes the false error information.

13. The method according to claim 1 comprising sending the false error information to the ECU and to at least one other ECU of the vehicle.

14. The method according to claim 2, wherein the false error information comprises a false error command that instructs the ECU to generate false error data; wherein the method comprises generating, by the ECU the false error data.

15. The method according to claim 1 comprising preventing a bypassing of the immobilizer by the sending of the false error information to the ECU.

16. A non-transitory computer readable medium that stores instructions that once executed by an immobilizer, cause the immobilizer to execute the steps of: providing false error information that is associated with a false error; wherein the false error information is false as it does not represent an occurrence of an actual error; wherein the false error information, once received or processed by an electronic control unit (ECU) of the vehicle, contributes to an immobilizing the vehicle during a vehicle start process; and sending the false error information to the ECU, during a vehicle shut down process that preceded the vehicle start process.

17. The non-transitory computer readable medium according to claim 16 that stores instructions for sending to the ECU, during the vehicle start process, revoking information for revoking the false error information; wherein the revoking information is provided by the immobilizer.

18. The non-transitory computer readable medium according to claim 17, wherein the false error information is false error data.

19. The non-transitory computer readable medium according to claim 17, wherein the false error information comprises a false error command that instructs the ECU to generate false error data.

20. The non-transitory computer readable medium according to claim 18 that stores instructions for generating the false error data at a format that equals a format of error data generated by an ECU to indicate an occurrence of an actual error.

21. The non-transitory computer readable medium according to claim 18 that stores instructions for generating the false error data; wherein the generating of the false error data comprises introducing a difference between a format of the false error data and a format of error data generated by an ECU to indicate an occurrence of an actual error.

22. The non-transitory computer readable medium according to claim 21, wherein the difference is detectable to a vehicle diagnostic system.

23. The non-transitory computer readable medium according to claim 17 that stores instructions for generating information about at least one out of false error messages and false error commands provided by the immobilizer.

24. The non-transitory computer readable medium according to claim 23 that stores instructions for feeding a vehicle diagnostic system with the information about the at least one out of the false error messages and the false error commands provided by the immobilizer.

25. The non-transitory computer readable medium according to claim 17 that stores instructions for distributing the false error information.

26. The non-transitory computer readable medium according to claim 16 that stores instructions for immobilizing the vehicle, during the vehicle start process and by the ECU, unless the immobilizer revokes the false error information.

27. The non-transitory computer readable medium according to claim 16 that stores instructions for preventing a bypassing of the immobilizer by the sending of the false error information to the ECU.

28. An immobilizer that comprises a communication module and a processor; wherein the processor is configured to provide false error information that is associated with a false error; wherein the false error information is false as it does not represent an occurrence of an actual error; wherein the false error information, once received or processed by an electronic control unit (ECU) of the vehicle, contributes to an immobilizing the vehicle during a vehicle start process; and wherein the communication module is configured to send the false error information to the ECU, during a vehicle shut down process that preceded the vehicle start process.

29. The immobilizer according to claim 28, wherein the immobilizer is configured to sending to the ECU, during the vehicle start process, revoking information for revoking the false error information; wherein the revoking information is provided by the immobilizer.

30. The immobilizer according to claim 29, wherein the false error information is false error data.

31. The immobilizer according to claim 29, wherein the false error information comprises a false error command that instructs the ECU to generate false error data.

32. The immobilizer according to claim 30, wherein the immobilizer is configured to generate the false error data at a format that equals a format of error data generated by an ECU to indicate an occurrence of an actual error.

33. The immobilizer according to claim 30, wherein the immobilizer is configured to generate the false error data; wherein the generating of the false error data comprises introducing a difference between a format of the false error data and a format of error data generated by an ECU to indicate an occurrence of an actual error.

34. The immobilizer according to claim 33, wherein the difference is detectable to a vehicle diagnostic system.

35. The immobilizer according to claim 29, wherein the immobilizer is configured to generate information about at least one out of false error messages and false error commands provided by the immobilizer.

36. The immobilizer according to claim 35, wherein the immobilizer is configured to feeding a vehicle diagnostic system with the information about the at least one out of the false error messages and the false error commands provided by the immobilizer.

37. The immobilizer according to claim 29 comprising distributing the false error information.

38. The immobilizer according to claim 28, wherein the immobilizer is configured prevent a bypassing of the immobilizer by the sending of the false error information to the ECU.

* * * * *